United States Patent
Jen-Chou (10) Patent No.: US 7,116,536 B2
(45) Date of Patent: Oct. 3, 2006

(54) ELECTROSTATIC DISCHARGE PROTECTION CIRCUIT

(75) Inventor: Tseng Jen-Chou, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 132 days.

(21) Appl. No.: 10/904,876

(22) Filed: Dec. 2, 2004

(65) Prior Publication Data

US 2006/0050451 A1    Mar. 9, 2006

(51) Int. Cl.
     *H02H 9/00* (2006.01)
(52) U.S. Cl. .......................................... 361/56; 361/56
(58) Field of Classification Search ................ 361/56
     See application file for complete search history.

(56) References Cited

U.S. PATENT DOCUMENTS

| | | | | |
|---|---|---|---|---|
| 5,708,549 A | * | 1/1998 | Croft | 361/56 |
| 5,978,192 A | * | 11/1999 | Young et al. | 361/56 |
| 6,223,130 B1 | * | 4/2001 | Gray et al. | 702/51 |
| 6,442,008 B1 | * | 8/2002 | Anderson | 361/56 |
| 6,535,368 B1 | * | 3/2003 | Andresen et al. | 361/56 |
| 6,552,406 B1 | * | 4/2003 | Voldman | 257/473 |
| 6,690,561 B1 | * | 2/2004 | Hung et al. | 361/111 |
| 6,919,602 B1 | * | 7/2005 | Lin et al. | 257/360 |
| 6,958,896 B1 | * | 10/2005 | Lin et al. | 361/56 |
| 6,965,503 B1 | * | 11/2005 | Connor et al. | 361/56 |
| 7,027,275 B1 | * | 4/2006 | Smith | 361/56 |
| 2004/0114288 A1 | * | 6/2004 | Cheng et al. | 361/56 |
| 2005/0030688 A1 | * | 2/2005 | Sakihama et al. | 361/91.1 |

* cited by examiner

*Primary Examiner*—Ronald W. Leja
(74) *Attorney, Agent, or Firm*—Jianq Chyun IP Office (57) ABSTRACT

An ESD protection circuit includes a detection circuit for detecting an ESD current and a bypass circuit for bypassing the ESD. The detection circuit and bypass circuit are connected to a first pad and a second pad. The bypass circuit is connected to an output terminal of the detection circuit. The bypass circuit comprises a MOS transistor, a first bipolar transistor and a second bipolar transistor. The drain of the MOS transistor, the collectors of the first bipolar transistor and the collector of the second bipolar transistor are connected to the first pad. The source and the substrate of the MOS transistor and the emitter of the second bipolar transistor are connected to the second pad. The base of the first bipolar transistor is connected to the gate of the MOS transistor and the emitter of the first bipolar transistor is connected to the base of the second bipolar transistor.

12 Claims, 6 Drawing Sheets

ELECTROSTATIC DISCHARGE PROTECTION CIRCUIT

BACKGROUND OF THE INVENTION

1. Field of the Invention

The present invention relates to an electrostatic discharge protection circuit. More particularly, the present invention relates to an electrostatic discharge protection circuit with a bypass circuit having a plurality of bipolar transistors connected in stack.

2. Description of the Related Art

In recent years, the integration of semiconductor devices advances by reducing the line width and increasing the number of stacked film layers. For example, in the metal-oxide-semiconductor (MOS) devices, the thickness of the gate oxide layer is reduced and the length of the channel is shortened as the MOS device is miniaturized. Furthermore, thickness of the junction between source and drain is reduced and the source/drain region is fabricated using the lightly doped drain (LDD) method. However, as the dimensions of integrated circuits (IC) are gradually reduced, the tolerance of current diminishes correspondingly. Therefore, the smaller the size of integrated circuits, the larger the damages caused by electrostatic discharge (ESD).

In general, the waveform of electrostatic discharge has a profile of a relatively large voltage (around 2000V) or current (around 1.3 Amp) within a very short rise time (often between 1 ns to 15 ns). Hence, if the integrated circuit receives electrostatic discharge suddenly, the integrated circuit may be burnt, damaged or punched through.

To prevent the damage of ESD to the integrated circuit, an electrostatic discharge protection circuit is normally installed between the highest voltage input terminal (VDD) and the lowest voltage input terminal (VSS) of the integrated circuit for bypassing most of the ESD current. Therefore, the ESD current are avoided to pass through the integrated circuit.

Figure 1:
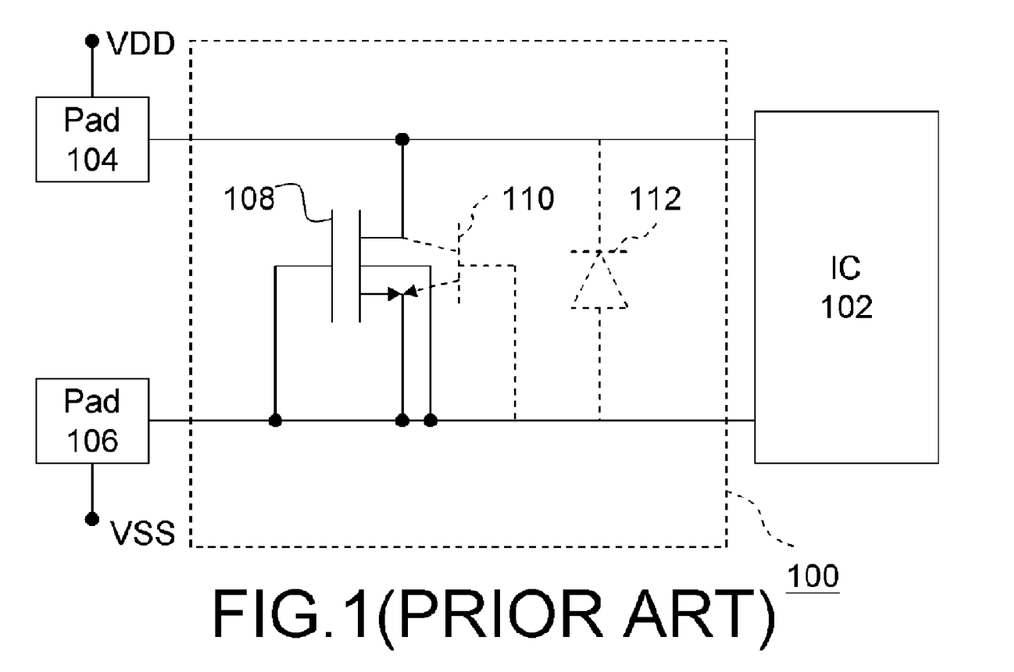
FIG. 1 is a diagram showing various elements in a conventional electrostatic discharge protection circuit.

FIG. 1 is a circuit diagram of a conventional ESD protection circuit. As shown in FIG. 1, the ESD protection circuit 100 including a gate-grounded N-type metal-oxide-semiconductor (GGNMOS) transistor 108 is connects with an integrated circuit 102 and two input pads 104 and 106 of the integrated circuit 102. The pad 104 is connected to an input voltage VDD and the drain of the NMOS transistor 108, and the other pad 106 is connected to input voltage VSS and the source, the gate and the substrate of the NMOS transistor 108. In general, the voltage VSS is a ground voltage. Therefore, when the ESD voltage received by the pad 104 is higher than that received by the pad 106, the parasitic bipolar transistor 110 (as dashed line 110 shown in FIG. 1) will turn on the NMOS transistor 108 to bypass the ESD current. On the contrary, when with the ESD voltage received by the pad 104 is lower than that received by the pad 106, a parasitic diode 112 (as dashed line 112 shown in FIG. 1) of the ESD protection circuit 100 or the integrated circuit 102 will be forward biased to bypass the ESD current. However, the performance of the ESD protection circuit shown in FIG. 1 is generally poor because the turn-on speed is rather slow.

Figure 2:
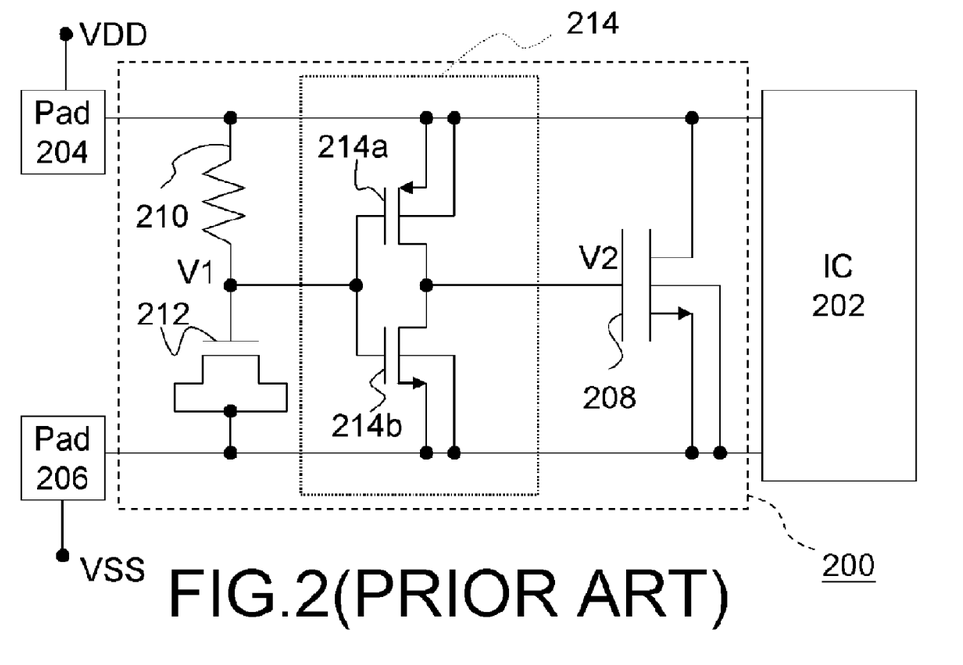
FIG. 2 is a diagram showing various elements in another conventional electrostatic discharge protection circuit.

FIG. 2 is a circuit diagram of another conventional ESD protection circuit. As shown in FIG. 2, the ESD protection circuit 200 is connected with an integrated circuit 202 and two input pads 204 and 206 of the integrated circuit 202. The pad 204 is connected to an input voltage VDD and the other pad 206 is connected to another input voltage VSS. The ESD protection circuit 200 comprises an NMOS transistor 208, a resistor 210, a capacitor 212 and an inverter 214. The drain of the NMOS transistor 208 is connected to the pad 204, the source of the NMOS transistor 208 and the substrate are connected to pad 206 and the gate of the NMOS transistor 208 is connected to an output terminal of the inverter 214. The resistor 210 is connected with the pad 204 and an input terminal of the inverter 214. The capacitor 212 connects with the pad 206 and the input terminal of the inverter 214. In FIG. 2, the capacitor 212 is a MOS transistor having its source and drain connected together. The inverter 214 includes a PMOS transistor 214a and an NMOS transistor 214b. The gate of the PMOS transistor 214a and the NMOS transistor 214b are connected together to serve as the input terminal of the inverter 214. The drain of the PMOS transistor 214a and the NMOS transistor 214b are connected together to serve as the output terminal of the inverter 214. The source terminal of the PMOS transistor 214a and the NMOS transistor 214b are connected to the pad 204 and 206 respectively.

The rise time of the resistance R of the resistor 210 and the capacitance C of the capacitor 212 is proportional to the product of R and C (i.e., referred to as the RC constant). In general, the rise time RC (conventionally between 0.1 μs to 1 μs) is much larger than the rise time of ESD current (conventionally between 1 ns to 15 ns). Therefore, when the ESD voltage received by the pad 204 is greater than that received by the pad 206, the voltage V1 (shown in FIG. 2) at the input terminal of the inverter 214 is at a low level relative to the voltage VDD. After the voltage V1 is inverted by the inverter 214, a high level voltage V2 is obtained. The voltage V2 is high enough to turn on the NMOS transistor 208 to bypass the ESD current. On the contrary, when the ESD voltage received by the pad 204 is smaller than that received by the pad 206, a parasitic diode of the NMOS transistor 208 within the ESD protection circuit 200 is forward biased and hence is able to bypass the ESD current.

Figure 3:
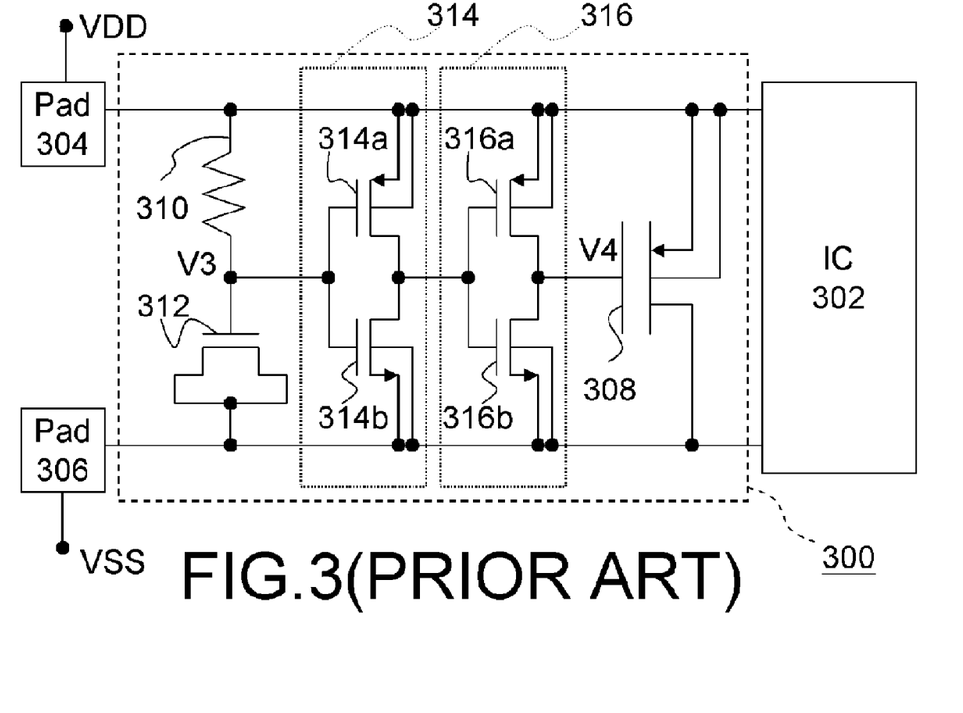
FIG. 3 is a diagram showing various elements in yet another conventional electrostatic discharge protection circuit.

FIG. 3 is a circuit diagram of yet another conventional ESD protection circuit. As shown in FIG. 3, the ESD protection circuit 300 is connected with an integrated circuit 302 and two input pads 304 and 306 of the integrated circuit 302. The pad 304 is connected to an input voltage VDD and the other pad 306 is connected to another input voltage VSS. The ESD protection circuit 300 includes a PMOS transistor 308, a resistor 310, a capacitor 312 and inverters 314 and 316. The source and the substrate of the PMOS transistor 308 are connected to the pad 304, the drain of the PMOS transistor 308 is connected to the pad 306 and the gate of the PMOS transistor 308 is connected to an output terminal of the inverter 316. The resistor 310 is connected to the pad 304 and an input terminal of the inverter 314. The capacitor 312 is connected to the pad 306 and the input terminal of the inverter 314. In FIG. 3, the capacitor 312 is a MOS transistor having its source and drain connected together. The inverter 314 comprises a PMOS transistor 314a and an NMOS transistor 314b. Similarly, the inverter 316 comprises a PMOS transistor 316a and an NMOS transistor 316b.

Referring to FIG. 3, when the ESD voltage received by the pad 304 is larger than that received by the pad 306, the voltage V3 (shown in FIG. 3) at the input terminal of the inverter 314 is at a low level relative to the voltage VDD. After the voltage V3 is inverted by the inverters 314 and 316, a low-level voltage V4 is obtained. The voltage V4 is low enough to turn on the PMOS transistor 308 to bypass the ESD current. Conversely, when the ESD voltage received by the pad 304 is smaller than that received by the pad 306, a parasitic diode of the PMOS transistor 308 within the ESD protection circuit 300 is forward biased and hence is able to bypass the ESD current.

One major drawback of the aforementioned techniques shown in FIGS. 2 and 3 is that the amplitude of the voltage V2 for switching the NMOS transistor 208 and the voltage V4 for switching the PMOS transistor 308 is dependent on the ESD current. As the ESD current rises, the current passing through the channel layer between the source and the drain under the gate of the NMOS transistor 208 or the PMOS transistor 308 increases. Therefore, a gate over-drive problem may be caused when the current is over a threshold level, and the areas close to the drain and the channel may be destructed. Thus, the performance of the conventional ESD protection is reduced.

Another drawback is that when the ESD protection circuit 200 or 300 is turned, the conductive resistance thereof is high, and the potential between the VDD terminal and the VSS terminal may be increased. Therefore, the possibility of damage the integrated circuit 202 or 302 or the circuit devices inside is also increased since the protection efficiency of the ESD protection circuit is reduced. In other words, the improvement of the performance of the ESD protection circuit is necessary.

SUMMARY OF THE INVENTION

Accordingly, the present invention is directed to an electrostatic discharge (ESD) protection circuit for preventing a metal-oxide-semiconductor (MOS) transistor in a bypass circuit from the gate over-drive problem.

In addition, the present invention is related to an ESD protection circuit for providing a lower conductive resistance and voltage surge for improving the protection efficiency of the devices inside an integrated circuit.

Moreover, the present invention is directed to an ESD protection circuit comprising extra clamping circuits for bypassing an ESD current.

According to one embodiment of the invention, an ESD protection circuit for bypassing an ESD current between a first pad and a second pad is provided. The EDS protection circuit may comprise, for example, a detection circuit and a bypass circuit. The detection circuit may be adopted for detecting an ESD current and is connected to the first pad and the second pad. The bypass circuit may be provided for bypassing the ESD current and is connected to the first pad, the second pad and an output terminal of the detection circuit. The bypass circuit may further comprise an N-type metal-on-semiconductor (NMOS) transistor, a first NPN bipolar transistor and a second NPN bipolar transistor. The drain of the NMOS transistor, the collector of the first NPN bipolar transistor and the collector of the second NPN bipolar transistor are connected to the first pad. The source and the substrate of the NMOS transistor and the emitter of the second NPN bipolar transistor are connected to the second pad. The base of the first NPN bipolar transistor is connected to the gate of the NMOS transistor and the emitter of the first NPN bipolar transistor is connected to the base of the second NPN bipolar transistor.

In one embodiment of the present invention, the ESD protection circuit further comprises a third NPN bipolar transistor disposed between the emitter of the first NPN bipolar transistor and the base of the second NPN bipolar transistor. The collector of the third NPN bipolar transistor is connected to the first pad, the base of the third NPN bipolar transistor is connected to the emitter of the first NPN bipolar transistor and the emitter of the third NPN bipolar transistor is connected to the base of the second NPN bipolar transistor. Alternatively, in another embodiment, the ESD protection circuit further comprises a plurality of additional NPN bipolar transistors disposed between the emitter of the first NPN bipolar transistor and the base of the second NPN bipolar transistor. The base of a first one of the additional NPN bipolar transistors is connected to the emitter of the first NPN bipolar transistor. The base of a next one of the additional NPN bipolar transistors is connected to the emitter of a previous one of the additional NPN bipolar transistors, and an emitter of a last one of the additional NPN bipolar transistor is connected to the second pad. Furthermore, all the collectors of the additional NPN bipolar transistors are connected to the first pad.

In one embodiment of the present invention, the detection circuit comprises an inverter, a resistor and a capacitor. An output terminal of the inverter is connected to the output terminal of the detection circuit. The resistor connects with the first pad and an input terminal of the inverter. The capacitor connects with the second pad and the input terminal of the inverter.

In one embodiment of the present invention, the inverter comprises a first PMOS transistor and a first NMOS transistor. The gate of the first PMOS transistor is connected to the gate of the first NMOS transistor to serve as the input terminal of the inverter. The drain of the first PMOS transistor is connected to the drain of the first NMOS transistor to serve as the output terminal of the inverter. The source and the substrate of the first PMOS transistor are connected to the first pad and the source and substrate of the first NMOS transistor are connected to the second pad.

In one embodiment of the present invention, the first pad is connected to a voltage source VDD and the second pad is connected to another voltage source VSS.

According to another embodiment of the present invention, an alternative ESD protection circuit for bypassing an ESD current between a first pad and a second pad is provided. The EDS protection circuit comprises a detection circuit and a bypass circuit. The detection circuit may be adopted for detecting an ESD current, and may be connected to the first pad and the second pad. The bypass circuit may be adopted for bypassing the ESD current and may be connected to the first pad, the second pad and an output terminal of the detection circuit. The bypass circuit further comprises a P-type metal-on-semiconductor (PMOS) transistor, a first PNP bipolar transistor and a second PNP bipolar transistor. The source and substrate of the PMOS transistor and the emitter of the second PNP bipolar transistor are connected to the first pad. The drain of the PMOS transistor, the collector of the first PNP bipolar transistor and the collector of the second PNP bipolar transistor are connected to the second pad. The base of the first PNP bipolar transistor is connected to the gate of the PMOS transistor and the emitter of the first PNP bipolar transistor is connected to the base of the second PNP bipolar transistor.

In one embodiment of the present invention, the ESD protection circuit further comprises a third PNP bipolar transistor disposed between the emitter of the first PNP bipolar transistor and the base of the second PNP bipolar transistor. The collector of the third PNP bipolar transistor is connected to the second pad, the base of the third PNP bipolar transistor is connected to the emitter of the first PNP bipolar transistor and the emitter of the third PNP bipolar transistor is connected to the base of the second PNP bipolar transistor. Alternatively, in another embodiment, the ESD protection circuit further comprises a plurality of additional PNP bipolar transistors disposed between the emitter of the first PNP bipolar transistor and the base of the second PNP bipolar transistor. The base of a first one of the additional PNP bipolar transistors is connected to the emitter of the first PNP bipolar transistor. The base of a next one of the additional PNP bipolar transistors is connected to the emitter of a previous one of the additional PNP bipolar transistors, and the emitter of a last one of the additional PNP bipolar transistors is connected to the first pad. Furthermore, all the collectors of the PNP bipolar transistors are connected to the second pad.

In one embodiment of the present invention, the detection circuit comprises a first inverter, a second inverter, a resistor and a capacitor. An output terminal of the second inverter is connected to the output terminal of the detection circuit and an input terminal of the second inverter is connected to an output terminal of the first inverter. The resistor connects with the first pad and an input terminal of the first inverter. The capacitor connects with the second pad and the input terminal of the first inverter.

In one embodiment of the present invention, the first inverter or the second inverter comprises a first PMOS transistor and a first NMOS transistor. The gate of the first PMOS transistor is connected to the gate of the first NMOS transistor to serve as the input terminal of the first inverter or the second inverter. The drain of the first PMOS transistor is connected to the drain of the first NMOS transistor to serve as the output terminal of the first inverter or the second inverter. The source and the substrate of the first PMOS transistor are connected to the first pad and the source and substrate of the first NMOS transistor are connected to the second pad.

In one embodiment of the present invention, the first pad is connected to a voltage source VDD and the second pad is connected to another voltage source VSS.

In brief, the present invention provides a plurality of clamping circuits each comprising a series of bipolar transistors connected in stack. Thus, gate over-drive problem in the MOS transistor of the bypass circuit is prevented. Furthermore, the present invention also provides a lower conductive resistance and voltage surge so that the capacity for protecting the devices inside an integrated circuit is improved. Hence, the ESD protection circuit of the present invention has improved electrical performance. In addition, the bipolar transistors can bypass a portion of the ESD current and thus further protect the MOS transistor within the bypass circuit.

One or part or all of these and other features and advantages of the present invention will become readily apparent to those skilled in this art from the following description wherein there is shown and described one embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 4A:
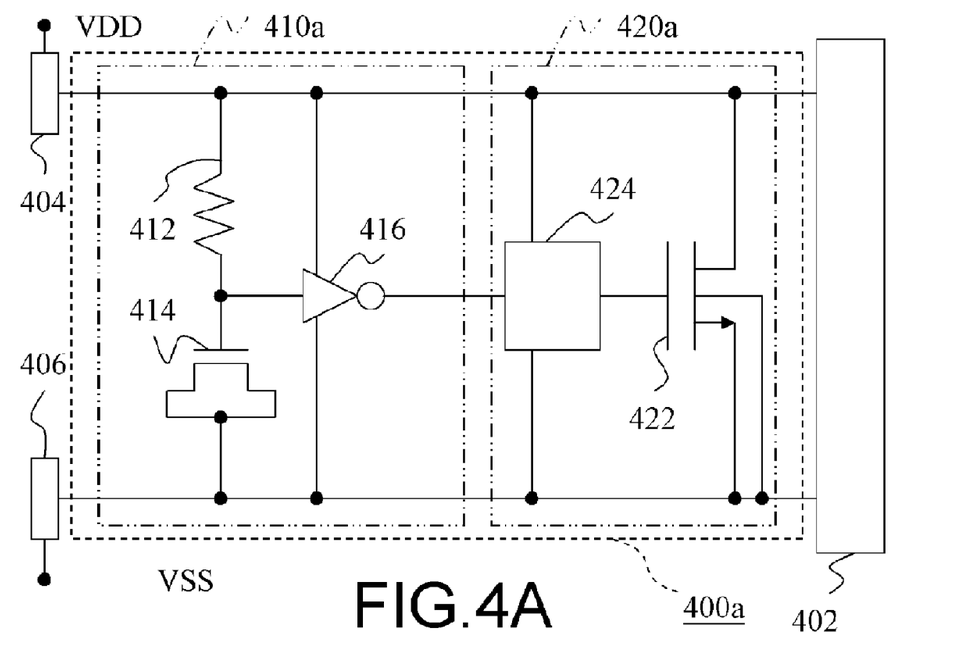
FIGS. 4A, 4B and 4C are circuit diagrams showing an electrostatic discharge protection circuit according to one embodiment of the present invention.
Figure 4B:
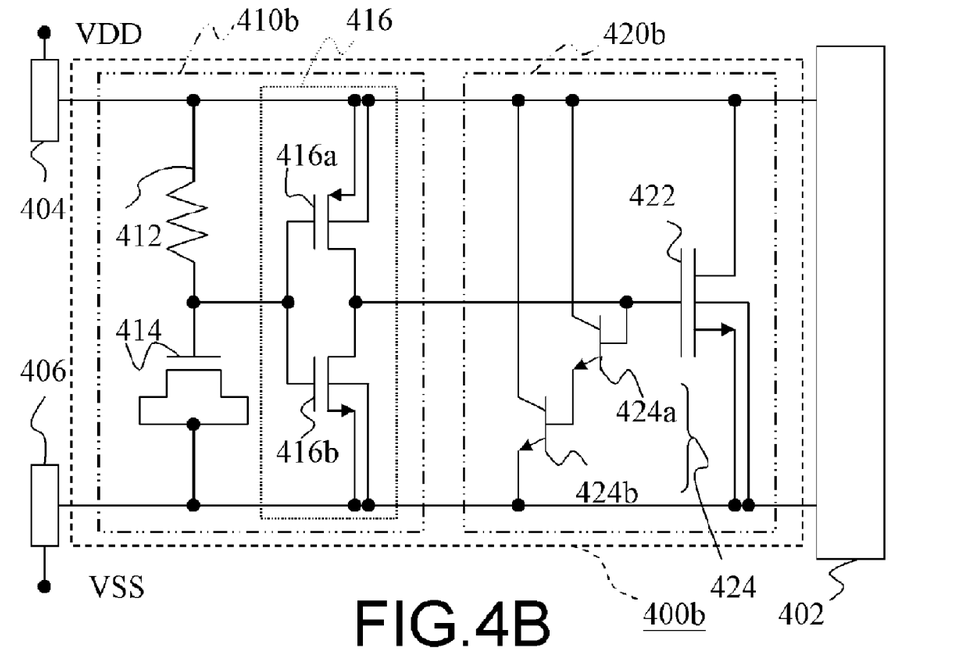
Figure 4C:
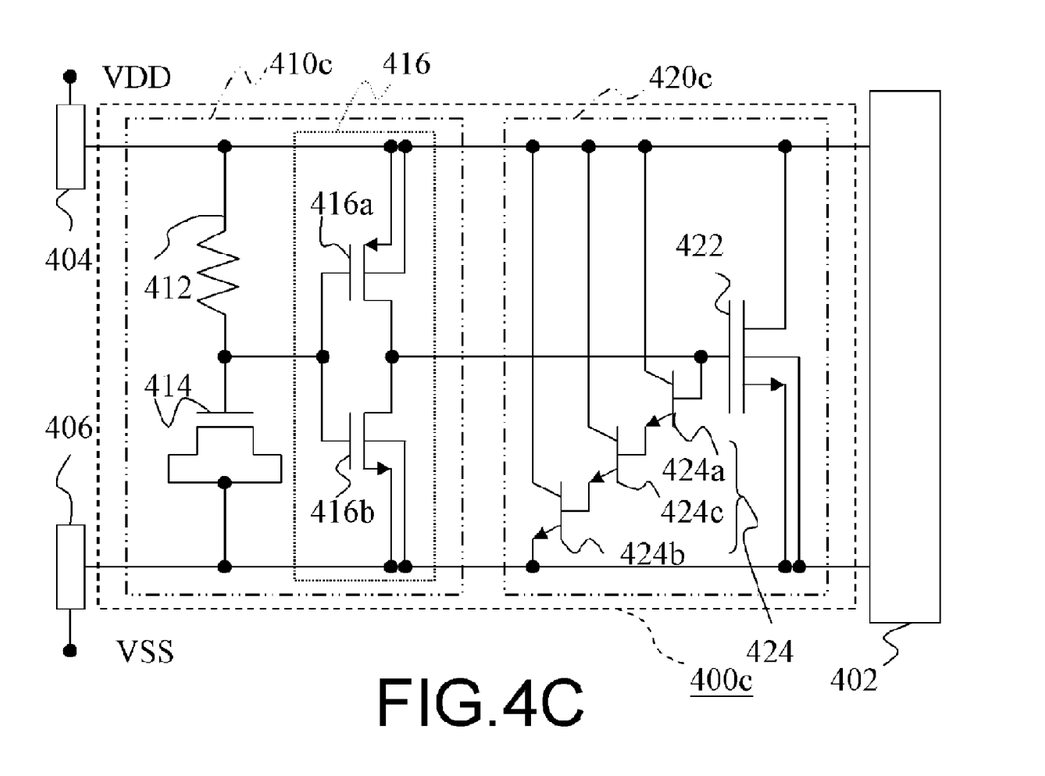

FIGS. 4A, 4B and 4C are schematic circuit diagrams illustrating an electrostatic discharge protection circuit according to one embodiment of the present invention. As shown in FIG. 4A, the ESD protection circuit 400a may comprise a detection circuit 410a and a bypass circuit 420a. The detection circuit 410a is connected to a first pad 404, a second pad 406 and an integrated circuit 402, and may be adopted for detecting an ESD current. The bypass circuit 420a is connected to the first pad 404, the second pad 406 and the output terminal of the detection circuit 410a, and may be adopted for bypassing the ESD current. In one embodiment of the present invention, the first pad 404 is connected to a voltage source VDD and the second pad 406 is connected to another voltage source VSS. It should be noted that the integrated circuit 402, the first pad 404 and the second pad 406 described above are only illustrated as an example of the present invention and should not be used to limit the scope of the present invention. In general, the ESD protection circuit can be applied to protect any devices against electrostatic discharge.

As shown in FIG. 4A, the detection circuit 410a may further comprise a resistor 412, a capacitor 414 and an inverter 416. The output terminal of the inverter 416 is connected the output terminal of the detection circuit 410a. The resistor 412 is connected to the first pad 404 and the input terminal of the inverter 416. The capacitor 414 is connected to the second pad 406 and the input terminal of the inverter 416. In one embodiment of the present invention, the capacitor 414 may be constructed by, for example, a MOS transistor having its source and drain connected together, for example. However, the capacitor 414 can be fabricated by some other methods.

As shown in FIG. 4A, the bypass circuit 420a may further comprise an N-type metal-oxide-semiconductor (NMOS) transistor 422 and a clamping circuit 424. The drain of the NMOS transistor 422 is connected to the first pad 404 and the source and the substrate of the NMOS transistor 422 are connected to the second pad 406. The gate of the NMOS transistor 422 is connected to the output terminal of the clamping circuit 424. The input terminal of the clamping circuit 424 is connected to the output terminal of the detection circuit 410a.

In another ESD protection circuit as shown in FIG. 4B, the ESD protection circuit 400b may comprise a detection circuit 410b and a bypass circuit 420b. The structure and connecting method of the detection circuit 410*b* is very similar to the detection circuit 410*a*. The inverter 416 within the detection circuit 410*b* may comprise, for example, a PMOS transistor 416*a* and an NMOS transistor 416*b*. The gate of the PMOS transistor 416*a* and the gate of the NMOS transistor 416*b* are connected together to serve as an input terminal of the inverter 416. The drain of the PMOS transistor 416*a* and the drain of the NMOS transistor 416*b* are connected together to serve as an output terminal of the inverter 416. The source and the substrate of the PMOS transistor 416*a* are connected to the first pad 404 and the source and substrate of the NMOS transistor 416*b* are connected to the second pad 406.

As shown in FIG. 4B, the clamping circuit 424 may comprise, for example, two NPN bipolar transistors connected in stack (in other words, the base of a next bipolar transistor is connected to the emitter of a previous bipolar transistor) with each other. The emitter of the NPN bipolar transistor 424*a* is connected to the base of the NPN bipolar transistor 424*b*. The collector of the NPN bipolar transistors 424*a* and 424*b* are connected to the first pad 404. The base of the NPN bipolar transistor 424*a* is connected to the output terminal of the detection circuit 410*b* and the emitter of the NPN bipolar transistor 424*b* is connected to the second pad 406.

In another ESD protection circuit as shown in FIG. 4C, the ESD protection circuit 400*c* may comprise a detection circuit 410*c* and a bypass circuit 420*c*. It is noted that, since the structure and connecting method of the detection circuit 410*c* is identical to the detection circuit 410*b*, a detailed description is omitted.

As shown in FIG. 4C, the clamping circuit 424 comprises three NPN bipolar transistors connected in stack, for example. The clamping circuit 424 in FIG. 4C has one NPN bipolar transistor 424*c* more than the clamping circuit 424 in FIG. 4B. The NPN bipolar transistor 424*c* is disposed between the emitter of the NPN bipolar transistor 424*a* and the base of the NPN bipolar transistor 424*b*. The collector of the NPN bipolar transistor 424*b* is connected to the first pad 404 and the base of the NPN bipolar transistor 424*b* is connected to the emitter of the NPN bipolar transistor 424*a*. The emitter of the NPN bipolar transistor 424*b* is connected to the second pad 406. The other connections in FIG. 4 are identical to the connections of the clamping circuit 424 shown in FIG. 4B.

It should be noted that the number of the NPN bipolar transistors used inside the ESD protection circuit is not limited to 2 (as shown in FIG. 4B) or 3 (as shown in FIG. 4C). The number of NPN bipolar transistors connected in stack of the present invention can be any integer number larger than two. In another embodiment of the present invention, the clamping circuit 424 may comprise a plurality of additional NPN bipolar transistors disposed between the emitter of the NPN bipolar transistor 424*a* and the base of the NPN bipolar transistor 424*b*. In these NPN bipolar transistors, the base of the first one of the additional NPN bipolar transistors is connected to the emitter of the NPN bipolar transistor 424*a*, the base of the next one of the additional NPN bipolar transistors is connected to the emitter of the previous one of the additional NPN bipolar transistors. The emitter of the last one of the additional NPN bipolar transistors is connected to the base of the NPN bipolar transistor 424*b*. Furthermore, all the collectors of the additional NPN bipolar transistors are connected to the first pad 404.

In the present invention, a clamping circuit 424 having a plurality of NPN bipolar transistors connected in stack is added to the bypass circuit such as the bypass circuit 420*b* or 420*c* in the present invention. Hence, the bias voltage Vgs between the gate and the source of the NMOS transistor 422 is maintained in a predetermined range to prevent from the gate over-drive problem in the NMOS transistor 422. In general, the resulted bias voltage Vgs is proportional to the number of NPN bipolar transistors in the clamping circuit 424. Therefore, the size of the NMOS transistor 422 and the number of NPN bipolar transistors can be determined through a preset ESD current tolerance level in the ESD protection circuit 400*b* or 400*c*. In addition, the present invention also ensures that the clamping circuit 424 may provide a low conductive resistance and voltage surge between the pads 404 and 406 when the pads 404 and 406 receives an ESD current. Therefore, the protection efficiency and the performance of the ESD protection circuit for the integrated circuit 402 is improved.

In addition, the NPN bipolar transistors can be adopted for bypassing a portion of the ESD current. For example, the collector of the NPN bipolar transistor 424*a* may be provided for bypassing a portion of the ESD current, and the amount of the current bypassed is proportional to the base current of the NPN bipolar transistor 424*a*. Thus, the larger the number of the NPN bipolar transistors, the larger the bypassed ESD current.

Figure 5A:
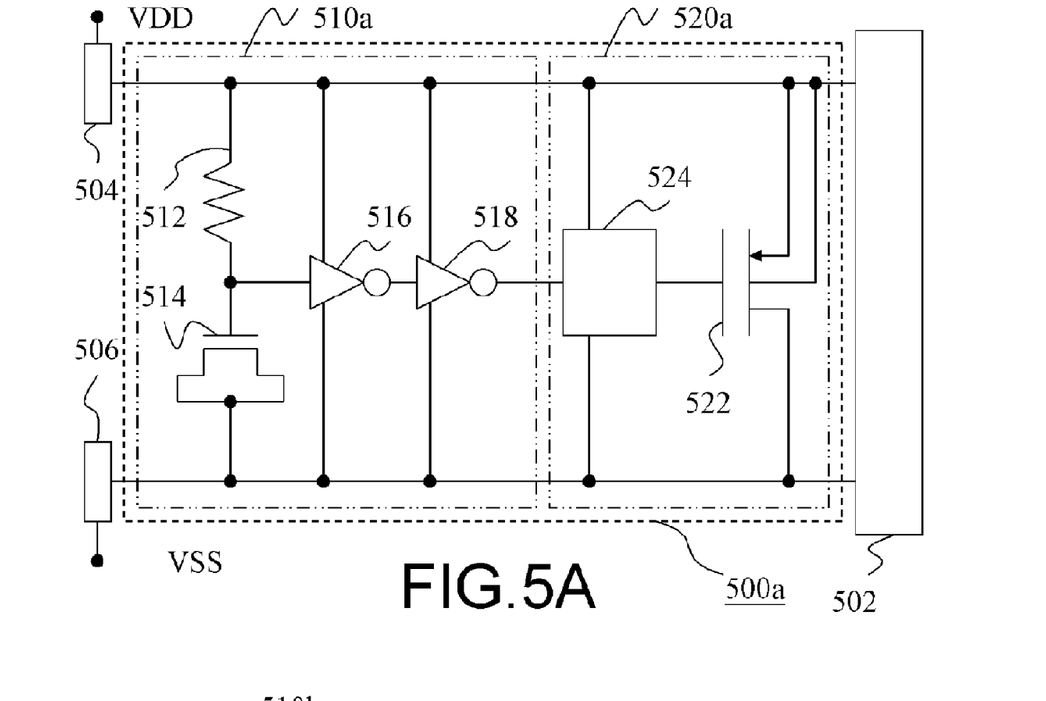
FIGS. 5A, 5B and 5C are circuit diagrams showing an electrostatic discharge protection circuit according to another embodiment of the present invention.
Figure 5B:
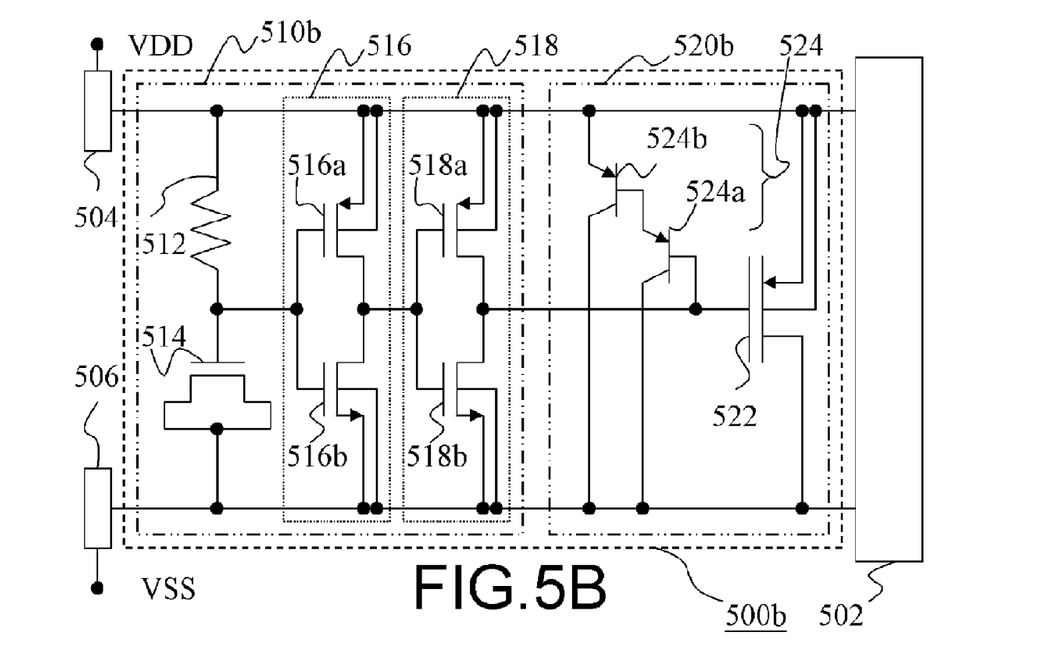
Figure 5C:
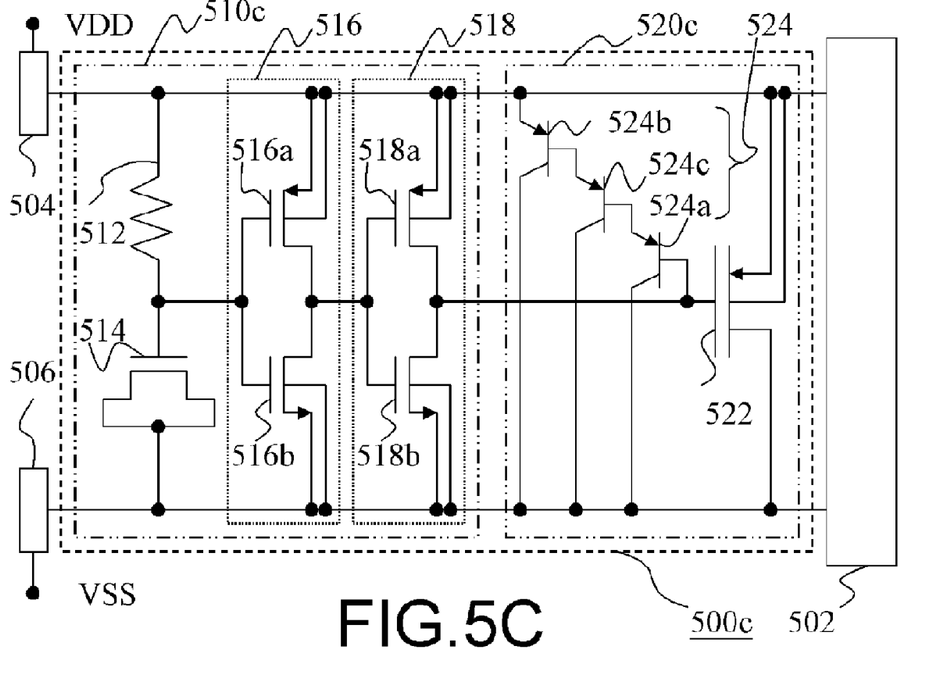

FIGS. 5A, 5B and 5C are schematic circuit diagrams illustrating an electrostatic discharge protection circuit according to another embodiment of the present invention. As shown in FIG. 5A, the ESD protection circuit 500*a* may comprise a detection circuit 510*a* and a bypass circuit 520*a*. The detection circuit 510*a* is connected to a first pad 504, a second pad 506 and an integrated circuit 502, and may be adopted for detecting an ESD current. The bypass circuit 520*a* is connected to the first pad 504, the second pad 506 and the output terminal of the detection circuit 510*a*, and may be adopted for bypassing the ESD current. In one embodiment of the present invention, the first pad 504 is connected to a voltage source VDD and the second pad 506 is connected to another voltage source VSS. It should be noted that the integrated circuit 502, the first pad 504 and the second pad 506 described above are only illustrated as an example of the present invention and should not be used to limit the scope of the present invention. In general, the ESD protection circuit can be applied to protect any devices against electrostatic discharge.

As shown in FIG. 5A, the detection circuit 510*a* may further comprise a resistor 512, a capacitor 514 and inverters 516 and 518. The output terminal of the inverter 518 is connected the output terminal of the detection circuit 510*a* and the input terminal of the inverter 518 is connected to the output terminal of the inverter 516. The resistor 512 is connected to the first pad 504 and the input terminal of the inverter 516. The capacitor 514 connects with the second pad 506 and the input terminal of the inverter 516. In one embodiment of the present invention, the capacitor 514 may be constructed by, for example, a MOS transistor having its source and drain connected together, for example. However, the capacitor 514 can be fabricated by some other methods.

As shown in FIG. 5A, the bypass circuit 520*a* may further comprise a P-type metal-oxide-semiconductor (PMOS) transistor 522 and a clamping circuit 524. The source and the substrate of the PMOS transistor 522 are connected to the first pad 504 and the drain of the PMOS transistor 522 is connected to the second pad 506. The gate of the PMOS transistor 522 is connected to the output terminal of the clamping circuit 524. The input terminal of the clamping circuit 524 is connected to the output terminal of the detection circuit 510*a*.

In another ESD protection circuit as shown in FIG. 5B, the ESD protection circuit 500*b* may comprise a detection circuit 510*b* and a bypass circuit 520*b*. The structure and connecting method of the detection circuit 510*b* is very similar to the detection circuit 510*a*. The inverter 516 within the detection circuit 510*b* may comprise, for example, a PMOS transistor 516*a* and an NMOS transistor 516*b*. Similarly, the inverter 518 within the detection circuit 510*b* comprises a PMOS transistor 518*a* and an NMOS transistor 518*b*, for example. The gate of the PMOS transistor 516*a* (518*a*) and the gate of the NMOS transistor 516*b* (518*b*) are connected together to serve as an input terminal of the inverter 516 (or 518). The drain of the PMOS transistor 516*a* (or 518*a*) and the drain of the NMOS transistor 516*b* (or 518*b*) are connected together to serve as an output terminal of the inverter 516 (518). The source and the substrate of the PMOS transistor 516*a* (or 518*a*) are connected to the first pad 504 and the source and substrate of the NMOS transistor 516*b* (or 516*b*) are connected to the second pad 506.

As shown in FIG. 5B, the clamping circuit 524 may further comprise, for example, two PNP bipolar transistors connected in stack. The emitter of the PNP bipolar transistor 524*a* is connected to the base of the PNP bipolar transistor 524*b*. The collector of the PNP bipolar transistors 524*a* and 524*b* are connected to the second pad 506. The base of the PNP bipolar transistor 524*a* is connected to the output terminal of the detection circuit 510*b* and the emitter of the PNP bipolar transistor 524*b* is connected to the first pad 504.

In another ESD protection circuit as shown in FIG. 5C, the ESD protection circuit 500*c* comprises a detection circuit 510*c* and a bypass circuit 520*c*. Since the structure and connecting method of the detection circuit 510*c* is identical to the detection circuit 510*b*, a detailed description is omitted.

As shown in FIG. 5C, the clamping circuit 524 may comprise three PNP bipolar transistors connected in stack, for example. The clamping circuit 524 in FIG. 5C has one PNP bipolar transistor 524*c* more than the clamping circuit 524 in FIG. 5B. The PNP bipolar transistor 524*c* is disposed between the emitter of the PNP bipolar transistor 524*a* and the base of the PNP bipolar transistor 524*b*. The collector of the PNP bipolar transistor 524*b* is connected to the second pad 506 and the base of the PNP bipolar transistor 524*b* is connected to the emitter of the PNP bipolar transistor 524*c*. The emitter of the NPN bipolar transistor 524*b* is connected to the first pad 504. The other connections in FIG. 4 are identical to the connections of the clamping circuit 524 shown in FIG. 5B.

It should be noted that the number of the PNP bipolar transistors used inside the ESD protection circuit is not limited to 2 (as shown in FIG. 5B) or 3 (as shown in FIG. 5C). The number of PNP bipolar transistors connected in stack of the present invention can be any integer number larger than two. In another embodiment of the present invention, the clamping circuit 524 may comprise a plurality of additional PNP bipolar transistors disposed between the emitter of the PNP bipolar transistor 524*a* and the base of the PNP bipolar transistor 524*b*. In these PNP bipolar transistors, the base of the first one of the additional PNP bipolar transistors is connected to the emitter of the PNP bipolar transistor 524*a*, the base of the next one of the additional PNP bipolar transistors is connected to the emitter of the previous one of the additional PNP bipolar transistors. The emitter of the last one of the additional PNP bipolar transistors is connected to the base of the PNP bipolar transistor 524*b*. Furthermore, all the collectors of the PNP bipolar transistors are connected to the second pad 506.

In the present invention, a clamping circuit 524 having a plurality of PNP bipolar transistors connected in stack is added to the bypass circuit such as the bypass circuit 520*b* or 520*c* in the present invention. Hence, the bias voltage Vgs between the gate and the source of the PMOS transistor 522 is maintained in a predetermined range to prevent from the gate over-drive problem in the PMOS transistor 522. In general, the resulted bias voltage Vgs is proportional to the number of PNP bipolar transistors in the clamping circuit 524. Therefore, the size of the PMOS transistor 522 and the number of PNP bipolar transistors can be determined through a preset ESD current tolerance level in the ESD protection circuit 500*b* or 500*c*. In addition, the present invention also ensures that the clamping circuit 524 may provide a low conductive resistance and voltage surge between the pads 504 and 506 when the pads 504 and 506 receives an ESD current. Therefore, the protection efficiency and the performance of the ESD protection circuit for the integrated circuit 502 by the ESD protection circuit is enhanced.

In addition, the PNP bipolar transistors can be adopted for bypassing a portion of the ESD current. For example, the collector of the PNP bipolar transistor 524*a* may be provided for bypassing a portion of the ESD current, and the amount of the current bypassed is proportional to the base current of the PNP bipolar transistor 524*a*. Thus, the larger the number of the NPN bipolar transistors, the larger the bypassed ESD current.

In summary, since the present invention provides a clamping circuit comprising a plurality of bipolar transistors connected in stack, therefore the gate over-drive problem in the MOS transistor of the bypass circuit is prevented. Furthermore, the present invention may also provide a lower conductive resistance and voltage surge so that the protection efficiency and the performance of the devices inside an integrated circuit is improved. In addition, the bipolar transistors can bypass a portion of the ESD current and thus the loading of the MOS transistor in the bypass circuit is reduced.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electrostatic discharge (ESD) protection circuit for bypassing an ESD current between a first pad and a second pad, comprising:
a detection circuit for detecting an ESD current, wherein the detection circuit is connected to the first pad and the second pad; and
a bypass circuit for bypassing the ESD current, wherein the bypass circuit is connected to the first pad, the second pad and the output terminal of the detection circuit, the bypass circuit comprises an N-type metal-oxide-semiconductor (NMOS) transistor, a first NPN bipolar transistor and a second NPN bipolar transistor, wherein a drain of the NMOS transistor, a collector of the first NPN bipolar transistor and a collector of the second NPN bipolar transistor are connected to the first pad, and a source and a substrate of the NMOS transistor and an emitter of the second NPN bipolar transistor are connected to the second pad, a base of the first NPN bipolar transistor is connected to a gate of the NMOS transistor and an emitter of the first NPN bipolar transistor is connected a base of the second NPN bipolar transistor.

2. The ESD protection circuit of claim 1, wherein the ESD protection circuit further comprises a third NPN bipolar transistor disposed between the emitter of the first NPN bipolar transistor and the base of the second NPN bipolar transistor, wherein a collector of the third NPN bipolar transistor is connected to the first pad, a base of the third NPN bipolar transistor is connected to the emitter of the first NPN bipolar transistor and an emitter of the third NPN bipolar transistor is connected to the base of the second NPN bipolar transistor.

3. The ESD protection circuit of claim 1, wherein the ESD protection circuit further comprises a plurality of additional NPN bipolar transistors disposed between the emitter of the first NPN bipolar transistor and the base of the second NPN bipolar transistor, wherein a base of a first one of the additional NPN bipolar transistors is connected to the emitter of the first NPN bipolar transistor, a base of a next one of the additional NPN bipolar transistors is connected to an emitter of a previous one of the additional NPN bipolar transistors, and an emitter of a last one of the additional NPN bipolar transistors is connected to the base of the second NPN bipolar transistor, and all collectors of the additional NPN bipolar transistors are connected to the first pad.

4. The ESD protection circuit of claim 1, wherein the detection circuit comprises:
an inverter comprising an output terminal connected to the output terminal of the detection circuit;
a resistor connected to the first pad and the input terminal of the inverter; and
a capacitor connected to the second pad and the input terminal of the inverter.

5. The ESD protection circuit of claim 4, wherein the inverter further comprises:
a first PMOS transistor; and
a first NMOS transistor, wherein a gate of the first PMOS transistor and a gate of the NMOS transistor are connected together to serve as the input terminal of the inverter, a drain of the first PMOS transistor and a drain of the first NMOS transistor are connected together to serve as the output terminal of the inverter, a source and a substrate of the first PMOS transistor are connected to the first pad, a source and a substrate of the first NMOS transistor are connected to the second pad.

6. The ESD protection circuit of claim 1, wherein the first pad is connected to a voltage source VDD and the second pad is connected to a voltage source VSS.

7. An electrostatic discharge (ESD) protection circuit for bypassing an ESD current between a first pad and a second pad, comprising:
a detection circuit for detecting the ESD current, wherein the detection circuit connects with the first pad and the second pad; and
a bypass circuit for bypassing the ESD current, wherein the bypass circuit is connected to the first pad, the second pad and the output terminal of the detection circuit, the bypass circuit comprises a P-type metal-oxide-semiconductor (PMOS) transistor, a first PNP bipolar transistor and a second PNP bipolar transistor, wherein a source and a substrate of the PMOS transistor and an emitter of the second PNP bipolar transistor are connected to the first pad, a drain of the PMOS transistor, a collector of the first PNP bipolar transistor and a collector of the second PNP bipolar transistor are connected to the second pad, and a base of the first PNP bipolar transistor is connected to a gate of the PMOS transistor, and an emitter of the first PNP bipolar transistor is connected to a base of the second PNP bipolar transistor.

8. The ESD protection circuit of claim 7, wherein the ESD protection circuit further comprises a third PNP bipolar transistor disposed between the emitter of the first PNP bipolar transistor and the base of the second PNP bipolar transistor, wherein a collector of the third PNP bipolar transistor is connected to the second pad, a base of the third PNP bipolar transistor is connected to the emitter of the first PNP bipolar transistor and an emitter of the third PNP bipolar transistor is connected to the base of the second PNP bipolar transistor.

9. The ESD protection circuit of claim 7, wherein the ESD protection circuit further comprises a plurality of additional PNP bipolar transistors disposed between the emitter of the first PNP bipolar transistor and the base of the second PNP bipolar transistor, wherein a base of a first one of the additional PNP bipolar transistors is connected to the emitter of the first PNP bipolar transistor, a base of the next one of the additional PNP bipolar transistors is connected to an emitter of the previous one of the additional PNP bipolar transistors, and an emitter of a last one of the additional PNP bipolar transistors is connected to the base of the second PNP bipolar transistor, and all collectors of the additional PNP bipolar transistors are connected to the second pad.

10. The ESD protection circuit of claim 7, wherein the detection circuit comprises:
a first inverter;
a second inverter comprising an output terminal connected to the output terminal of the detection circuit and an input terminal connected to the output terminal of the first inverter;
a resistor connected to the first pad and an input terminal of the first inverter; and
a capacitor connected to the second pad and the input terminal of the first inverter.

11. The ESD protection circuit of claim 10, wherein the first inverter or the second inverter comprises:
a first PMOS transistor; and
a first NMOS transistor, wherein a gate of the first PMOS transistor and a gate of the NMOS transistor are connected together to serve as an input terminal of the first inverter or the second inverter, a drain of the first PMOS transistor and a drain of the first NMOS transistor are connected together to serve as an output terminal of the first inverter or the second inverter, a source and a substrate of the first PMOS transistor are connected to the first pad, a source and a substrate of the first NMOS transistor are connected to the second pad.

12. The ESD protection circuit of claim 7, wherein the first pad is connected to a voltage source VDD and the second pad is connected to a voltage source VSS.

* * * * *